Sept. 2, 1941.   G. C. MORGAN   2,254,951
LINT CONDENSER
Filed April 29, 1939   4 Sheets-Sheet 1

INVENTOR
GEORGE C. MORGAN
BY
ATTORNEYS

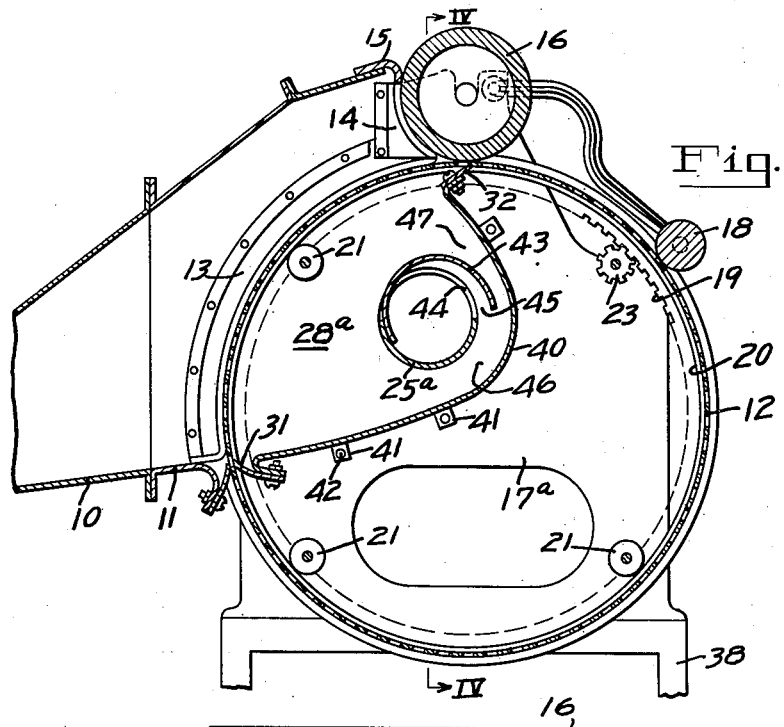
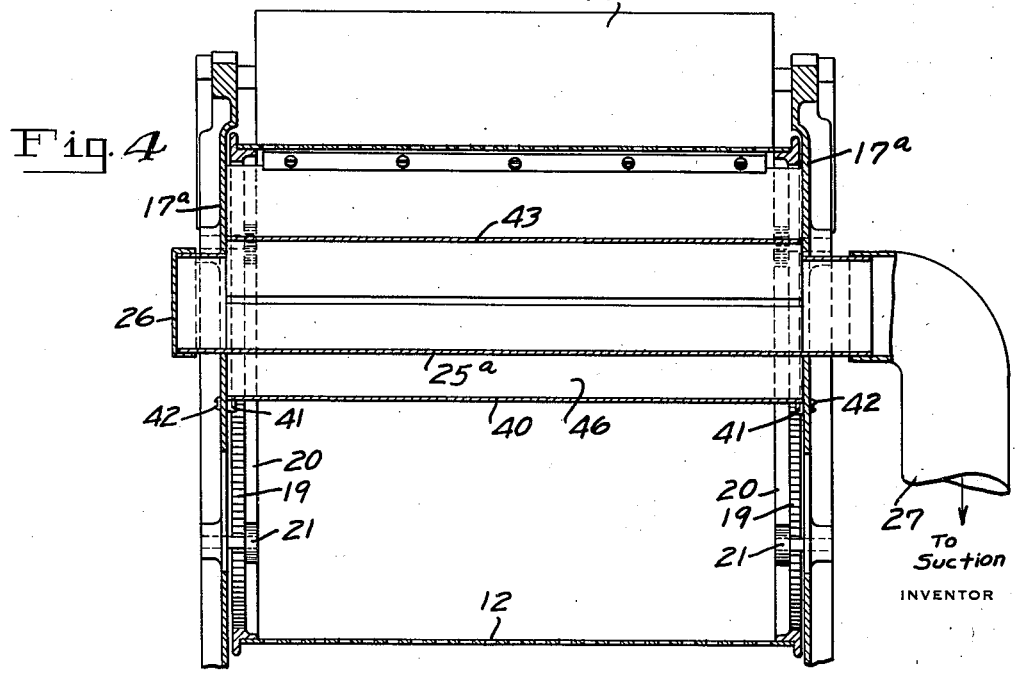

INVENTOR
GEORGE C. MORGAN
BY
ATTORNEYS

Patented Sept. 2, 1941

2,254,951

UNITED STATES PATENT OFFICE 2,254,951

LINT CONDENSER

George C. Morgan, Birmingham, Ala., assignor to Continental Gin Company, a corporation of Delaware Application April 29, 1939, Serial No. 270,758

21 Claims. (Cl. 19—156)

This invention relates to separating mechanism, such as lint condensers in current use in the cotton industry, which are designed and adapted to collect and remove lint, fibers and like material from an air current by the use of a moving foraminous screen or plate upon which the lint or fiber is deposited by the air current in its traverse of the screen, the screen being movable to permit the lint or fiber collected thereon to be withdrawn from the path of the air current and to present always clean screen surface to the air current for the collection thereon of lint or fiber in continuous operation.

In such apparatus the simplest form of screen is a rotating drum having a smooth foraminous surface forming the screen and when I refer to a drum or screen hereinafter, it is to be construed as inclusive of any foraminous screening element movable in any manner across the path of a fluid current and adapted to collect and remove lint or fibers therefrom.

Where apparatus of such a character is intended for the collection of light and delicate material, such as the fibers recovered in a cotton linter gin, it becomes of importance so to control the flow of the lint bearing air current, both in its approach to and departure from the collection zone traversed by the screen drum, that eddy currents and disturbances in the air flow shall be minimized or preferably eliminated and the deposit of the fibers on the moving surface of the drum can proceed undisturbedly, and in this same connection it is important that the means for conducting the air current to and from the active, or lint collecting surface portion, of the drum shall be so designed as to slow up the velocity of the air current so that the lint collecting action takes place in the zone of lowest air velocity, whereby the lint will be, as it were, gently but effectively deposited upon the active surface of the drum and only a minimum amount of it will be drawn along with the air current through the screen and either carried therewith to the waste or to a secondary collection apparatus. It has heretofore been the practice to enlarge the duct which delivers the air current to the active surface of the drum so that the air current is slowed up as it approaches the collection zone, but little if any consideration has been given to the design of the duct through which the air current that traverses the drum is withdrawn, and my present invention is particularly concerned with the design of the suction passage through which the air current, along with any entrained lint and foreign matter therein, is carried away from the inner active surface of the drum.

One feature of my invention consists in the provision of a suction passage adapted to withdraw the air current, that flows through the active surface of the drum, with a whirling motion about an axis extending lengthwise of the drum into a suction discharge pipe having its intake end substantially coaxial with the vortex of said whirl.

More particularly my invention contemplates collecting the air current, withdrawn from the active surface of the drum, in a chamber which is contracted toward its axially disposed outlet so as to cause the air current to flow with increasing velocity towards, and to enter so as to produce a whirling motion in, the suction outlet duct.

A further feature of my invention consists in providing valve or damper means to regulate or control the area of the connection between the chamber and suction duct so that the action of the apparatus can be accommodated to variations in the air current velocity, the humidity of the air, and other variable operating conditions, to control, by a more exact regulation of the volumetric flow of the current, the suction effect produced on the active drum surface.

My invention further contemplates the location of a suction duct either within or without the suction chamber and having communication therewith so as to produce a tangential inflow of air.

My invention in its preferred form further lays stress on the design of the suction chamber so that its walls will not produce eddy currents therein but will tend to deflect all air entering through the active surface of the drum toward a common outlet zone where it will enter the suction duct and be carried off.

My invention further contemplates inducing a whirling discharge of the air from the suction chamber not only by a tangential delivery thereof into a suction duct but also by means of baffles and deflectors in the suction chamber, or by a combination of both of said means, whereby the air current at increasing velocity is drawn into a whirl from whence with an equalized rate of discharge it will flow off along the vortex of the whirl into a suction discharge pipe.

My invention is further characterized by the fact that the lint and lighter particles become collected at the vortex of the whirl, whereas the heavier foreign matter is centrifugally displaced therefrom and is caused to move along a helical path about the axis of the whirl as a center until it passes away from the drum.

My invention further contemplates utilizing the inertia set up in the whirl of outgoing air to bring about automatically, and without the necessity of mechanical means, an equalization of the effect of the suction draft, applied at either or both ends of the whirl, on the drum so that there will be no tendency of the air to short circuit nor any unbalance or disturbance of the uniform collection of lint lengthwise of the drum.

In accordance with the various embodiments of my invention, I have conceived a fiber collecting mechanism, or more exactly a lint condenser, which is effective to separate a large portion of the dirt from the lint being collected on the drum, thereby producing a much better sample, and by means of which such dirt as is separated from the lint and passes with the air current through the drum, is removed from the condenser by suction takeoff means and discharged in such manner as to promote cleanliness in the condenser room, safety in the operation of the apparatus, and an improved grade of lint.

These and other features of my invention are illustrated in the accompanying drawings forming a part of this application, in which—

Fig. 3 is a view corresponding to Fig. 1 of a modification of my invention in which the suction chamber is defined by a parabolic deflecting wall with the suction duct arranged in or near the focus of the parabola.

Fig. 4 is a sectional view taken on the line IV—IV of Fig. 3.

Figure 1:
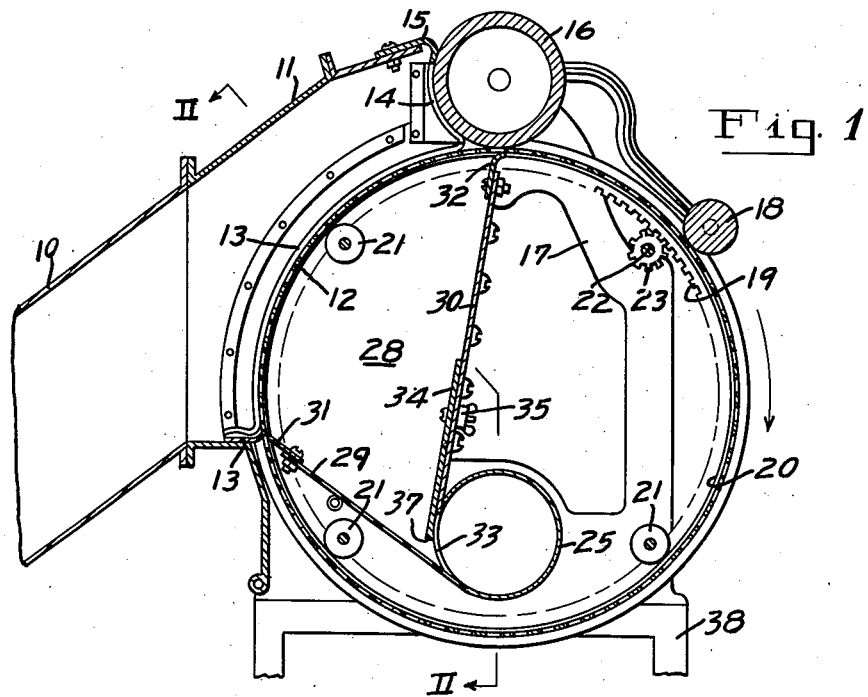
Fig. 1 is a sectional elevation of a condenser constructed in accordance with one embodiment of my invention.

Figs. 5 to 12 inclusive, are diagrammatic views corresponding to the cross sectional views of Figs. 1 and 3 and illustrating various modifications and applications of the principle underlying my present invention.

Similar reference numerals refer to similar parts throughout the drawings.

Figure 2:
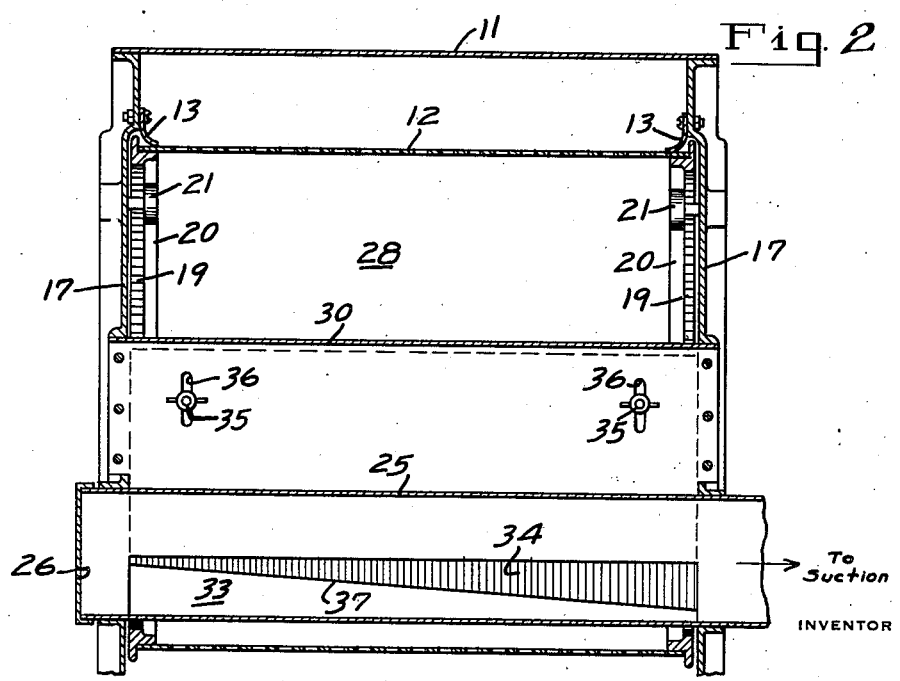
Fig. 2 is a sectional view taken on the line II—II of Fig. 1.

Referring to the drawings for a better understanding of my invention, I show in Figs. 1 and 2 a pipe or duct 10, leading from a linter gin or other source of supply of the fiber or like material to be recovered, which is connected to a flaring duct 11 which delivers the lint bearing air current to the active foraminous surface portion of a rotating drum 12. An arc of approximately 90° of the drum periphery is shown subtended by this duct 11 the end edges of which conform to the circular exterior of the drum and are provided with packing 13 to seal the bottom and side joints between the duct 11 and the drum, and also with packing 14 and 15 to seal the side and top joints between the duct 11 and a top presser roll 16, which is loosely mounted in guides, not shown, in the end frames or heads 17 of the condenser so as to ride on the top of the drum and define by contact therewith the upper limit of the active drum surface or lint collecting area. Swinging arms, pivotally supported by the head, carry pivotally mounted thereon a bat collecting roll 18. The lint or fiber, which is collected in a bat on the clockwise rotating foraminous surface of the drum and is compressed or condensed by the roll 16, is stripped therefrom and wound up on the roll 18 as a typical collecting means.

The drum carries at each end an internal ring gear 19 and an annular track 20. Three supporting rolls 21, journalled in each head 17, engage said tracks in such manner as to rotatably support the drum, and a drive shaft 22, also journalled in the drum heads 17, is provided with pinions 23 which mesh with the internal gears 19 and drive the drum in a clockwise direction.

Suitable openings are provided in each of the drum heads 17 for the passage therethrough of a suction duct 25, closed at one end by a cap 26 and at the other end having a suitable connection to a suction pipe 27 (Fig. 4) leading to any suitable point of discharge or treatment apparatus for the recovery of such lint as may remain in the outgoing air current.

I define a suction chamber 28 within the drum by means of converging baffle or deflector walls 29 and 30, these walls being suitably bolted to the heads 17 in any suitable manner and the deflector 29 having a flexible wiper strip 31 adapted to engage the inner peripheral surface of the drum and seal the lower joint between the foraminous drum surface and chamber 28. The drum heads 17 close the ends of the chamber 28 and a wiper strip 32 seals the upper joint between the deflector 30 and the drum.

These deflectors form a downwardly converging chamber which opens tangentially into the suction duct 25 through an axially disposed rectangular slot 33 in the latter, the cross sectional area of which slot is controlled by an adjustable slide valve 34 suitably mounted on the deflector by attaching means which permit of its vertical adjustment, such as bolts with wing nuts 35 and slots 36 to accommodate the adjustment of the valve. The lower or control edge 37 of this valve is preferably struck on a taper which will gradually reduce the effective area of the outlet port 33 toward the suction discharge end of the duct 25, as is more clearly shown in Fig. 2.

The foraminated peripheral surface 12 of the drum is preferably of smooth perforated metal having apertures of such diameter as to catch and hold the lint or fiber to be collected thereon while permitting the free passage therethrough of the lint or fiber bearing air current together with fine dirt and foreign matter entrained therein, or drawn therewith from the lint collected on the drum. I have found that such a surface provides for freer stripping of the bat from the drum and tends to produce a clean white sample due to the separation of dirt therefrom. While perforations of various sizes may be satisfactorily used, I have found that a condenser for lint cotton will give excellent results where the perforations in the screen drum are of approximately $\frac{3}{32}''$ diameter arranged with the usual number of perforations per square inch.

The drum heads 17 carry appropriate bearings for the supporting rolls 21 and for the drive shaft 22 and the condenser is supported on a suitable base or foundation 38. A close clearance substantially leak proof is maintained by means of the sealing strips 13, 14, 15, 31 and 32 between the moving drum periphery and the air supply duct 11 on the one side and the suction chamber 28 on the other side, so that air leakage is reduced to a minimum and an efficient suction action is had through duct 25 and chamber 28 over the whole interior of the active surface of the drum.

It is a function of the valve 34 to vary the size of the tangential access opening 33 into the suction duct 25 and thereby to vary the volume and velocity of the dirt laden air entering said duct and passing off with a vortex whirl therethrough into the suction pipe 27. This valve, by having its working edge struck on a taper, will also provide a mechanical means for equalizing the suction action, applied at one end of the duct 25, so that it will be substantially uniformly effective on the drum lengthwise thereof and short circuiting of the air will be avoided, and this is accomplished by the effect of the valve in gradually restricting the cross sectional area of the duct inlet 33 as it approaches the suction and of the duct. It is, however, important to note that this valve need not be tapered to provide a mechanical means for equalizing the suction effect lengthwise of the duct in the drum, because this same effect is obtained automatically by the design and arrangement of the suction chamber and duct to cause a gradual acceleration of the air flow as it approaches the inlet to duct 25, and then when it attains its maximum velocity it is delivered tagentially into the duct so as to induce therein a whirl about the long axis of the duct 25. This high velocity whirl produces a vortex along the axis of the duct throughout which the suction effect from pipe 27 is established and about which the inertia of the high velocity air whirl resists any tendency of the air to short circuit toward the suction end of the duct 25 and causes the air current, delivered by the duct 11 to the drum, to be drawn through the drum apertures with substantially uniform suction effect and carried across the suction chamber 28 in such manner as to be withdrawn axially through the vortex of an induced whirl.

Observations of the action of the air whirl in the duct 25 show that the entrained fiber and light lint particles become immediately collected in the vortex of the air whirl and pass out, along an inner spiral path, adjacent to the axis of the duct 25, into the suction pipe 27, whereas heavier particles of dirt and foreign matter, upon which the centrifugal force is more effective, become separated out and displaced to the outer zone of the whirl and travel out along an outer spiral path which sweeps them along over the interior surface of the duct 25 and keeps the latter clean and free of any accumulation of foreign matter therein. The centrifugal separation of the paths of the lint and dirt effected by the whirl in flue 25 produces a beneficial effect on the quality and cleanness of the lint or fiber later recovered from the escaping air current, particularly if the whirling motion of the outgoing air be maintained throughout the suction system so as to prevent the commingling of the lint and dirt streams in the suction system.

It will be noted that the zone of lowest velocity of the air current lies immediately adjacent both faces of the active working surface of the drum, and thus the air current being decelerated as it approaches, and accelerated as it leaves, the drum will attain its lowest velocity at the zone of separation therefrom of the main body of lint collected on the outer surface of the drum, and this is important to reduce to a minimum the amount of lint carried with the air current into chamber 28. By designing the chamber 28 to apply the suction effect more uniformly over the inner face of the active drum surface, a more effective cleaning action is had on the collecting mass of lint, and more dirt, dust and foreign matter are removed with the use of the desired relatively low air velocity through the drum.

From the foregoing description the operation of my condenser should be readily understood. The lint carried from the gin, or other source of supply, by means of an induced air current through the duct elements 10 and 11 impinges against the foraminous surface 12 of the drum which is being driven to rotate in the direction of the arrow, Fig. 1. The dirt carried by the lint passes along with some lint through the perforated metal covering of the drum into the suction chamber 28 defined by the partition members 29 and 30 and the end walls 17.

The compression roller 16, bearing downwardly against the periphery of the drum, compresses the lint collected thereon into a bat which is taken off by the bat roller 18, this being a typical illustration of any means for the stripping or removal of the collected mass of lint from a nonactive portion of the drum 12. The dirt laden air passing through the active surface of the drum 12 flows downwardly with increasing velocity toward the lateral intake slot 33 of the suction duct 25 and enters the latter at high velocity tangentially so as to flow therethrough in a vortex whirl into the offtake flue or suction pipe 27, whence it is conveyed by suction to any suitable point. The velocity of the air stream entering the suction duct 25 may be varied by the positioning of the valve plate 34 so as to insure that the bottom partition member 29 will be swept clean at all times and that dirt will not build up in the collecting chamber 28. I have found it highly important to maintain a whirling motion of the air and dirt in the ducts 25 and 27, otherwise the dirt will tend to build up and collect in areas of relatively low velocity and thereby obstruct the flues and the lint will not separate itself from the dirt. From the foregoing it will be apparent that I devise and construct a lint collector which is simple of construction, reliable of operation, and which is effective to separate the dirt from the lint and discharge it in a manner whereby the fire hazard in the plant is reduced, the working conditions for the operator improved, and a better lint sample obtained.

The design of the chamber 28, as shown in Fig. 1, does not represent the preferred embodiment of my invention by reason of the fact that the shape and arrangement of the baffle wall 30 are not such as to assist, in the most effective way, in diverting the entering air without the creation of eddy currents that tend to interfere with its undisturbed stream flow with a smooth increase in its velocity toward and into its exit whirl in duct 25.

An improved type of suction chamber is illustrated in Figs. 3 and 4, wherein the general construction and arrangement of parts and their operation are such as has already been described. In this arrangement the drum heads 17a are somewhat different in design from the heads 17. The chamber 28a is defined by a curved baffle wall 40 having attaching lugs 41 at both ends by means of which it is connected, by rivets or bolts 42, to the heads 17a, holes being preferably drilled in proper position in said heads so that when the lugs are bolted therethrough the plate 40 will form the parabolic curve illustrated. The suction duct 25a is disposed within the chamber 28a and is substantially co-axial with the focus of the parabola. The duct 25a has its upper half cut away throughout its traverse of the chamber 28a and a curved baffle plate 43 has its end toward the active surface of the drum inserted in and welded, or otherwise attached, to the left hand edge of the top opening 44 in the duct. The other end of the baffle overhangs beyond the duct and provides a tangential intake opening 45 lying between the duct and the sharply curved in wall of the chamber 28a, being preferably adjacent to, but not necessarily lying in the major diametric plane of the parabola. The effect of this arrangement is to induce a converging and accelerating flow of most of the air entering the chamber 28a with a whirling motion into a contracted passage 46, lying between the duct and the parabolic wall, and thence tangentially into the duct 25a. A small amount of air and some foreign matter will flow downwardly through a secondary air passage 47 between the deflector 43 and the chamber wall in a direction counter to the main air current, but it will not be sufficient in volume to disturb the even flow of the main current and will reverse itself and merge therewith with a tangential flow as it moves into the duct 25a. The sweep of the air with increasing velocity will carry up with it any lint or other matter tending to settle on the rising bottom wall of the chamber 28a and will sweep same into the suction duct 25a. In this arrangement the walls of the chamber 28a are so designed that they tend to deflect all of the air impinging thereon toward the intake 45 for the suction duct and the opening for this duct being shielded from direct exposure to the active surface of the drum will tend to distribute the suction effect with marked uniformity over the whole interior face of the active drum surface, thus producing ideal working conditions for the collection of lint on the drum, eliminating eddy currents in chamber 28a that might tend to disturb the deposit of lint, and equalizing the suction to avoid excessive air flow through any part of the drum surface that would tend to cause a waste of lint and produce a less effective cleaning action than where the air is drawn constantly and effectively through the accumulating bat during its entire traverse of the lint collection zone, i. e., that zone lying between the bottom of the duct and the presser roll 16.

By reference to Fig. 4, it will be seen that the opening 45 into the duct 25a is uniform throughout its traverse of the chamber 28 and this illustrates the effect referred to that the whirling motion induced in the air current has to equalize the suction action lengthwise of the chamber 28a. The inertia of the accelerated whirl at the point of ingress into the opening 45 is such as to substantially neutralize the unbalanced pull on the pipe 25a due to the connection of the suction pipe 27 at one end thereof.

Figure 8:
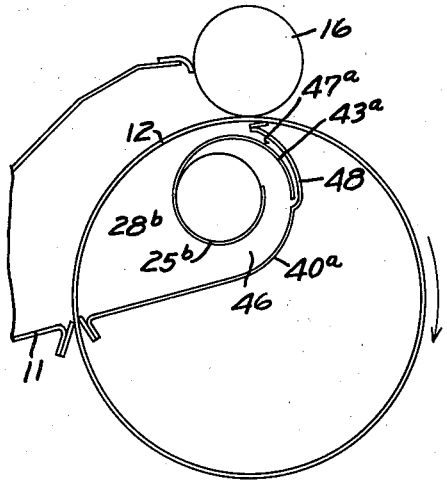

In Fig. 8 I show diagrammatically a slight modification of the duct 25a and of the deflector wall 40, as shown in Fig. 3, the deflector 43a being enlarged and its free edge received in an offset 48 formed in the rising portion of the wall 40a of chamber 28b. The operation is the same in respect of the whirling and accelerated current induced through the passage 46 and delivered tangentially into the duct 25b. The effect of the offset 48 is to provide a Venturi inlet for the secondary air passage 47a to connect with the tangential entrance to the suction duct 25b and to deliver this secondary current so as to create less disturbance to the main current flowing through the passage 45.

Figure 5:
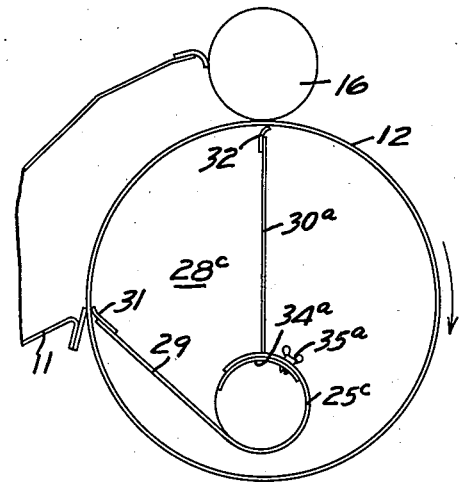

In Fig. 5 the general arrangement of parts shown in Fig. 1 is followed, except that the partition wall 30a is disposed radially of, and vertical to, the outlet duct 25c and thus provides a suction chamber 28c better designed than chamber 28 to avoid the creation of eddy currents therein. Further, in place of the flat sliding plate valve 34, I show an arcuate sleeve valve 34a fitted into the duct 25c and held adjusted to position therein by the wing nuts 35a, thereby to control the area of the intake opening into the duct 25c.

Figure 6:
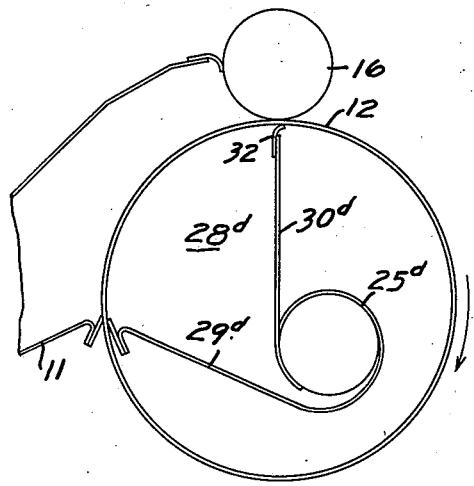

In Fig. 6 the bottom partition wall 29d at its inner end is given a scroll shape to define a duct 25d into which the air enters tangentially, being deflected by the converging walls 29d and 30d, the lower end of which latter wall is curved to define a portion of said chamber 28d. This provides a very simple and effective design for the whirling offtake of the air current and foreign matter therein, with the intake opening from the chamber 28d into 25d so shielded that there is no tendency to short circuit the air thereinto from the active drum surface or to disturb the equalization of the suction effect thereon.

Figure 7:
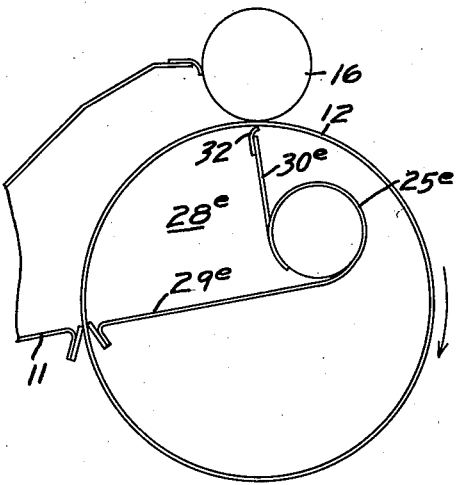

In Fig. 7 the arrangement of parts follows that shown in Fig. 6, with exception that the wall 29e of the suction chamber 28e forms a rising continuation in line with the bottom of the duct 11. In this arrangement the opening into the duct 25e remains effectively shielded from direct exposure to the active surface of the drum.

Figure 9:
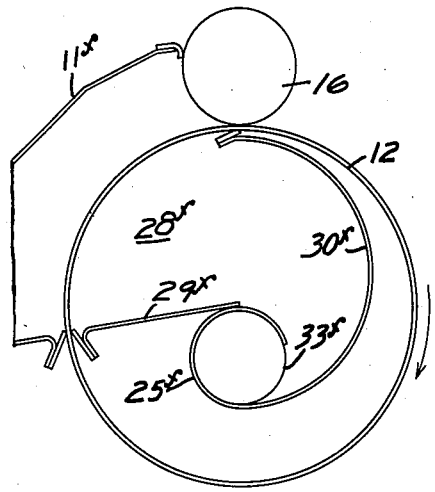

In Fig. 9 the suction chamber 28f is defined between a bottom wall 29f, disposed like 29e, and a volute or scroll partition wall 30f extending from the top of the drum and merging tangentially into, or forming, the outlet suction duct 25f which has its intake opening 33f also shielded from direct exposure to the working surface of the drum. The partition wall 29f is joined to the top of the duct. This produces a volute chamber which delivers the air tangentially into the duct 25f through the shielded opening 33f.

Figure 10:
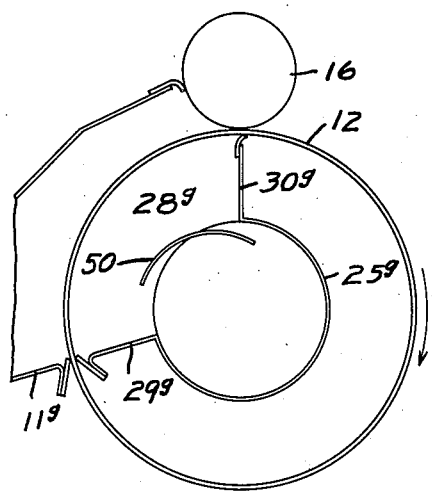

In Fig. 10 I show an enlarged suction duct 25g opening into the suction chamber 28g which is defined between the vertical partition 30g, leading upwardly from one edge of the duct intake opening to the drum, and the lower partition 29g, forming a continuation of the bottom of the intake duct 11 and connecting with the bottom of the duct intake opening. An arcuate baffle or deflector 50 is mounted so as to shield the duct intake opening and to produce the desired whirl within the duct.

Figure 11:
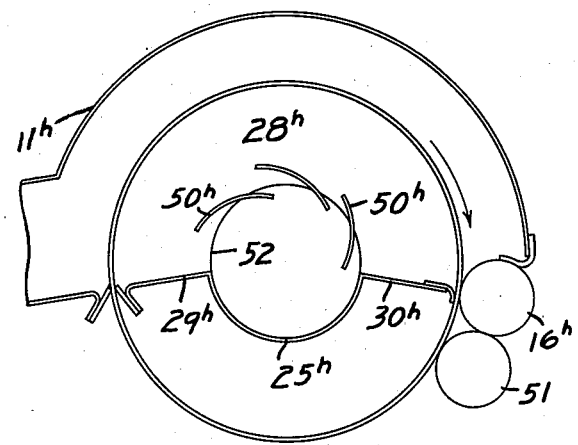

In Fig. 11 I show the same general idea disclosed in Fig. 10 as applied to an enlarged suction chamber 28h, which subtends more than half of the drum, the air duct having an extension or head 11h subtending the drum from the duct side to the pressure roll 16h, which latter is associated with a stripping roll 51. The chamber 28h is defined by the partition walls 29h and 30h and the suction duct 25h is connected thereto through its open upper half which is shielded by a series of curved deflectors 50h that act to set up and induce the whirling action in the outgoing air current flowing to the suction outlet indicated at 52.

Figure 12:
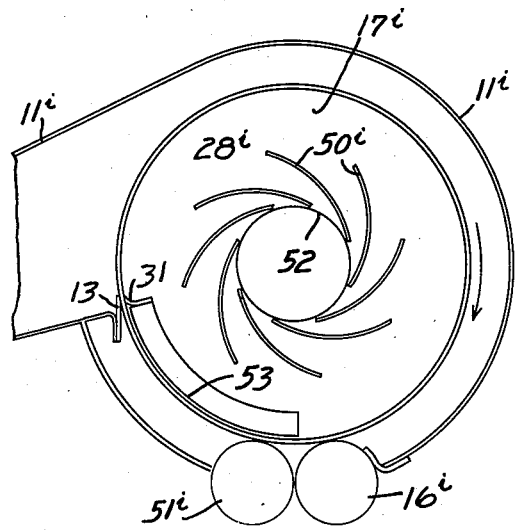

In Fig. 12 the duct 11i merges into a curved wall 11i which continues around to the bottom presser roll 16i with which a stripper roll 51i is associated. Baffle walls 53 blank off the perforated drum portion from the roll 16i and to a point in line with the bottom of the duct 11b. In this design the chamber 28i is annular and the suction duct therein may be said to be defined by a multiplicity of arcuate deflectors 50i arranged equi-distantly in a circle and extend from end to end of the chamber 28i. Their design and arrangement is such as to cause all of the air currents drawn thereinto through the drum to take on a whirling motion which will produce a vortex whirl in the central space, corresponding to the suction duct, which extends co-axially through the drum and delivers the air current into the outlet opening 52 formed in one of the two end walls 17i of the drum head which close the ends of the suction chamber 28i. The inner ends of the deflectors 50i lie tangent to the projected curved surface of the outlet 52.

In all of these varied arrangements there is present the induced whirl of the air confined between end walls and its withdrawal in a vortex extending laterally across the suction chamber. There is an acceleration of the air as it approaches the vortex whirl, and there is a more or less effective shielding of the opening into the duct or vortex space in which the whirl is set up, so that the suction exerted through such vortex is more or less equalized, by the inertia of the air flowing into the vortex, so as to provide for the desired uniformity of suction action in the inner face of the active surface of the drum, however large or small the latter may be.

The foregoing diagrammatic illustrations have been interposed to exemplify applications of the principle underlying my invention with the suction duct disposed either within or without the suction chamber, and constituted as a separate element or as a duct formed in part, or in whole, by either or both walls that define the suction chamber, or defined in part, or in whole, by curved deflecting baffles, and also to illustrate the manner in which the suction chamber can be expanded to subtend any desired sector of the foraminous drum surface.

In these diagrammatic views, I have omitted a showing of the roll 18 as such is merely a conventional illustration of any means for stripping or removing from the drum the lint or fiber collected thereon in its traverse of the lint bearing air current. This application forms a continuation in part of my copending application Serial Number 211,522.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a lint condenser and the like, a rotatable foraminous drum associated with means to deliver a lint bearing air current to a portion of its outer periphery, means defining a chamber within the drum adapted to receive the air current that traverses the drum, said chamber converging toward its outlet end, and a suction duct into which said outlet end opens in position to deliver the air stream into said duct tangentially to induce a whirl therein of the air about an axis lengthwise of said drum.

2. An apparatus according to claim 20, in which the suction means comprises a volute duct disposed lengthwise of and within said chamber with an axially disposed intake opening arranged to deliver air tangentially thereinto.

3. An apparatus according to claim 15, in which the chamber has its side walls so disposed with relation to the axis of the pipe as to deflect towards said axis substantially all air currents traversing the lint collecting portion of the drum.

4. In a lint condenser and the like, a moving foraminous surface, means to deliver a lint bearing air current to a portion of said surface, means to define a chamber disposed to receive the air current traversing said surface, said means comprising a substantially parabolic curved wall, and a suction duct having an intake opening adjacent to, and elongated in the direction of, the focus of said curved wall.

5. In a lint condenser and the like, a moving foraminous surface, means to deliver a lint bearing air current to a portion of said surface, means to define a chamber disposed to receive the air current traversing said surface, said means comprising a substantially parabolic curved wall, and a suction duct having an intake opening within said chamber and facing said curved wall.

6. In a lint condenser and the like, a moving foraminous surface, means to deliver a lint bearing air current to a portion of said surface, means to define a chamber disposed to receive the air current traversing said surface, said means comprising a substantially parabolic curved wall, and a suction duct disposed within said chamber adjacent to the focus of the parabolic curve of said wall and having an intake opening adjacent to said curved wall.

7. In a lint condenser and the like, a moving foraminous surface, means to cause a lint bearing air current to traverse a portion of said surface and leave lint deposited thereon, and means to conduct the air current away from said surface comprising a suction chamber, deflector means arranged across said chamber and curved to deflect said air current tangentially into a whirl about an axis substantially parallel with said surface, and transversely of its direction of movement, and a suction duct to carry off said air in a whirl.

8. In a linter condenser, a rotary foraminous cylinder, a supporting frame for the cylinder, end walls on the frame between which the cylinder rotates, upper and lower partition means joining the end walls and cooperating with the interior surface of the cylinder to form with the drum a collecting chamber, and a suction offtake flue extending longitudinally through the lower part of said cylinder and having a slot along one side thereof, the lower of said partition means inclining downwardly and merging into said slot tangentially of the offtake flue, and the other partition means forming with the lower partition a converging chamber terminating in a nozzle arranged for the discharge of air and dirt tangentially into the flue.

9. In a linter condenser, a rotary foraminous cylinder, a supporting frame for the cylinder, end walls on the frame between which the cylinder rotates, upper and lower partition means joining the end walls and cooperating with the interior surface of the cylinder to form with the drum a collecting chamber, and a suction offtake flue extending longitudinally through said cylinder and having a slot along one side thereof, the lower of said partition means merging into said slot tangentially of the offtake flue.

10. In a linter condenser, a rotary foraminous cylinder, a supporting frame for the cylinder, end walls on the frame between which the cylinder rotates, upper and lower partition means joining the end walls and cooperating with the interior surface of the cylinder to form with the drum a collecting chamber, a suction offtake flue extending longitudinally through the lower part of said cylinder and having a slot along one side thereof, the lower of said partition means inclining downwardly and merging into said slot tangentially of the flue, and the upper forming therewith a nozzle arranged for the tangential discharge of air and dirt into the flue, and adjustable means extending lengthwise of the nozzle to vary its slot area from end to end thereof.

11. In a condenser for lint from a cotton gin, a rotary foraminous cylinder, a frame for the cylinder, end walls on the frame closely spaced with respect to the cylinder, an upwardly extending partition extending through the cylinder and joined with the end walls, a downwardly inclined partition cooperating with the first mentioned partition and the cylinder to form a dirt collecting chamber, and an offtake suction flue disposed longitudinally in the lower part of the cylinder and having a slot along its lower edge to which said downwardly inclined partition is tangential, said partitions converging to form an air outlet arranged and disposed to deliver the air current tangentially into said flue.

12. In a condenser for lint from a cotton gin, a rotary foraminous cylinder, means to deliver air borne lint from the gin to said cylinder, a frame for the cylinder, end walls on the frame closely spaced with respect to the cylinder, an upwardly extending partition extending through the cylinder and jointed with the end walls, an inclined partition cooperating with the first mentioned partition and the cylinder to form a dirt collecting chamber, an offtake suction flue disposed longitudinally in the lower part of the cylinder and having a slot extending along one side thereof, the lower of said partition means merging with the lower side of the slot and forming with said inclined partion a discharge nozzle designed and arranged to deliver the air current flowing through said cylinder tangentially into the lower side of said flue, the upwardly extending partition being joined to the flue along the upper side of the slot, and means cooperating with the upwardly extending partition to vary the size of the nozzle.

13. Apparatus as set forth in claim 12, in which the offtake flue is closed at one end and discharges at the other and in which the means to vary the size of the nozzle comprises a plate extending along the nozzle and so disposed as to make the area of the nozzle less at the discharge end than the opposite end, and means to vary the position of the plate.

14. In a condenser for lint from a cotton gin, a rotary foraminous cylinder adapted to gather the lint on its outer surface, a duct for delivering cotton from the gin to the cylinder, a compression roller coacting with the cylinder to form the lint into a bath, air seal means between the duct, the cylinder and the compression roll, stationary end walls coacting with the cylinder, an upwardly extending partition member extending through the cylinder and joined to the end walls to form a collection chamber within the cylinder, a suction offtake flue extending longitudinally of the cylinder and having a slot along one side thereof, and a downwardly inclined partition member joined tangentially to the lower side of the slot in the offtake flue and to the end walls and in conjunction with said upwardly extending partition forming a converging passage leading towards, and arranged and adapted to discharge air and dirt passing through the cylinder tangentially into the offtake flue.

15. In a cotton treating machine, means to collect fiber from an air stream, a chamber into which the treated air stream flows, and a suction pipe having an opening communicating with said chamber and disposed transversely to the line of flow of said air stream, the chamber walls being shaped to converge and accelerate the air flow towards said pipe opening and being disposed in tangential relation to said opening to transform the direction of flow of the current entering said pipe into rotary motion about the pipe's axis.

16. In a lint condenser and the like, a moving foraminous surface, means to deliver a lint-bearing current to a portion of said surface, means to define a chamber disposed to receive the air current traversing said surface, said means comprising a transverse wall having its ends juxtaposed to the said surface and converging towards a curved intermediate portion, and means defining a transverse volute outlet duct with its intake opening juxtaposed to said curved wall portion and arranged to receive air tangentially therefrom.

17. In an apparatus according to claim 16, in which the transverse wall is offset to permit the outer edge of the volute duct to stand in substantial alignment with the curved chamber wall facing the duct intake opening.

18. In a condenser, a rotary screen drum, a lint flue delivering air borne lint to a portion of said drum, and means within the drum to carry off the separated air current comprising a chamber whose lower wall forms a continuation substantially in alignment with the corresponding flue wall, and whose upper wall converges towards and joins on a curve to the lower wall, and an axially arranged volute outlet pipe having its outer edge curved downwardly and disposed in juxtaposition to said upper wall to leave a contracted passage and in tangential relation to said lower wall to receive therefrom the main outgoing air current.

19. In a lint condenser and the like, a moving foraminous element for collecting lint associated with means to deliver a lint bearing air current to a portion of said surface, a suction duct extending lengthwise of said collecting surface and transversely to its movement, guide means to deliver the outgoing air current tangentially into said duct to induce therein the vortex whirl, and an inlet valve arranged to control the regulated delivery of the air current drawn through said foraminous lint collecting surface tangentially into said duct.

20. In a lint condenser and the like, a moving foraminous collecting element, means associated therewith to deliver a lint bearing air current to the lint collecting portion of said element, a chamber disposed to receive the air current drawn through the lint collecting portion of said element, and suction means comprising guide means within said chamber to deliver the air current to be withdrawn from said chamber tangentially into a whirl about an axis extending transversely to the direction of approach of said air current, and means to discharge the whirling air from said chamber.

21. In a linter condenser, a rotary foraminous cylinder, a supporting frame for the cylinder, end walls on the frame between which the cylinder rotates, upper and lower partition means joining the end walls and cooperating with the interior surface of the cylinder to form with the drum a collecting chamber, and a suction offtake flue extending longitudinally through said cylinder and having a slot along one side thereof facing away from the approach of air thereto after its traverse of said cylinder, said partition means converging toward said flue, and forming therewith a nozzle arranged to effect a tangential discharge of air and dirt through said slot into the flue.

GEORGE C. MORGAN.